May 16, 1944.  J. SNEED  2,348,759
GEAR CUTTERS
Filed Jan. 21, 1941
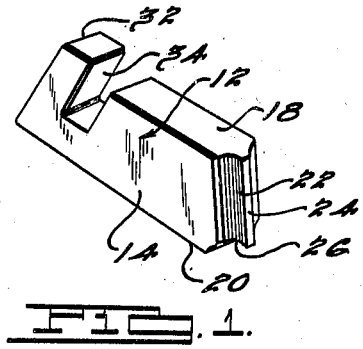
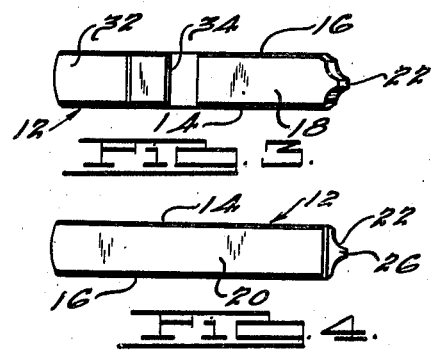
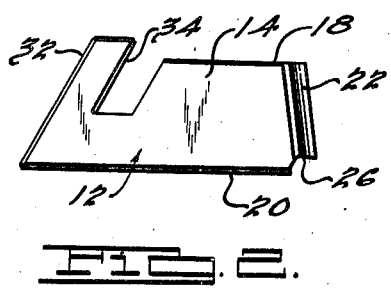
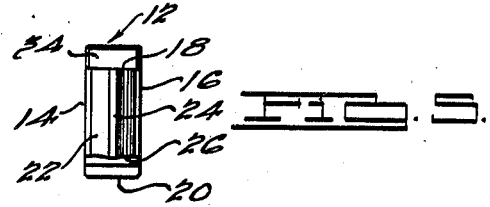
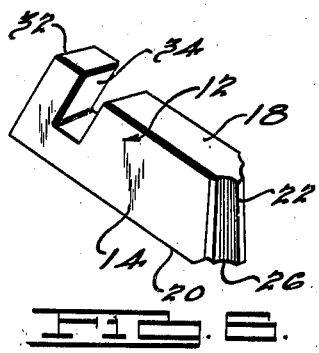
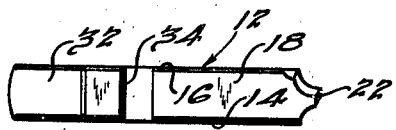
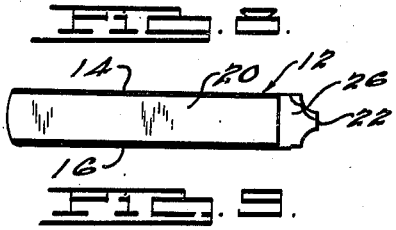
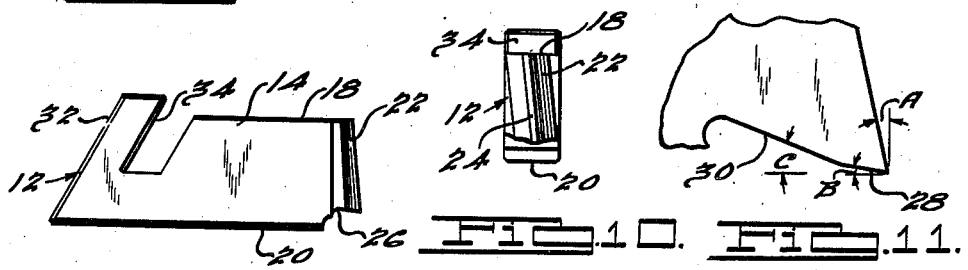
INVENTOR
John Sneed.
BY
Harness, Dickey & Pierce.
ATTORNEYS.

Patented May 16, 1944

2,348,759

UNITED STATES PATENT OFFICE 2,348,759

GEAR CUTTER

John Sneed, Huntington Woods, Mich.

Application January 21, 1941, Serial No. 375,115

5 Claims. (Cl. 29—95)

The present invention relates to gear cutters, and particularly relates to the type of gear cutter which is adapted for use in the type of gear forming machine disclosed and claimed in the copending application of John Sneed, Serial No. 375,116, filed January 21, 1941.

One of the primary objects of the present invention is to provide improved gear cutters of the type mentioned in the use of which all of the teeth of an external gear may be simultaneously formed, so that the entire interdental space be-between the adjacent teeth of the gear to be cut is removed by a single cutter.

Another object of the invention is to provide an improved gear cutter of the type mentioned by which helical gear teeth may be cut in an expeditious and improved manner.

A further object of the present invention is to provide an improved cutter of the type mentioned, which may be radially fed with respect to a gear blank in an improved manner.

A further object of the invention is to provide an improved gear cutter which may be radially sharpened and has a comparatively long life.

Another object of the invention is to provide an improved gear cutter in which the difficulties of chip interference are substantially reduced.

Other objects of the invention will become apparent from the following specification, the drawing relating thereto, and from the claims hereinafter set forth.

In the drawing, in which like numerals are used to designate like parts in the several views throughout:

Figure 1 is a perspective view of a gear cutter embodying features of the present invention, which is adapted for use in cutting spur gears;

Fig. 2 is a side elevational view of the cutter shown in Fig. 1;

Fig. 3 is a top plan view of the cutter shown in Fig. 1;

Fig. 4 is a bottom plan view of the cutter shown in Fig. 1;

Fig. 5 is a front elevational view of the cutter shown in Fig. 1;

Fig. 6 is a perspective view of a modified form of cutter embodying features of the present invention, which is adapted for use in cutting helical gears;

Fig. 7 is a side elevational view of the cutter shown in Fig. 6;

Fig. 8 is a top plan view of the cutter shown in Fig. 6;

Fig. 9 is a bottom plan view of the cutter shown in Fig. 6;

Fig. 10 is a front elevational view of the cutter shown in Fig. 6; and

Fig. 11 is an enlarged fragmentary, side elevational view of the cutter tip illustrating certain details thereof according to the present invention.

The gear cutters of the present invention are preferably formed of high speed steel by form grinding and, referring to Figures 1 through 5, one form of such cutters is illustrated which is adapted for use in cutting spur gears. The cutter includes a main body portion 12 which in transverse section is rectangular in form defined by sides 14 and 16, a top edge 18, and a bottom edge 20.

An elongated cutting portion is formed along one end edge thereof, as indicated at 22. The surfaces of such cutting portion are involute in form, and the form has a cross-sectional configuration conforming to the shape of the entire interdental space between the teeth of the gear to be cut. Longitudinal linear elements which form the surfaces of the cutting portion 22 are substantially parallel to the sides 14 and 16 in that such cutter is adapted for use in cutting spur gears, as mentioned above.

The end edge of the cutting portion 22 is indicated at 24 and tapers toward the side 18 at an angle to the vertical to provide for end clearance. Such angle is indicated at A in Figure 11 and may be about 5° for example. The leading cutting face of the cutting end 22 is indicated at 26, and preferably is in the form of adjacent flats which are transversely perpendicular to sides 14 and 16. The cutting edge 26 is ground to provide flats 28 and 30, which form angles B and C with the horizontal, as indicated in Fig. 11. Such angles are to provide for proper chip removal, so that the chips as they are cut from the stock do not interfere with the cutting operation. The angle B is preferably about 7°, and the angle C may be up to 15°; but such angles may be varied slightly within the scope of the present invention. The width of the flat 28 may be predetermined so that the flat 30 adjoins the flat 28 to relieve any possible chip interference as the chips are curled about the flat 28.

In order to provide for shifting the cutters radially with respect to the stock, as disclosed and claimed in the above mentioned copending application of John Sneed, the opposite end edge of the cutter, as indicated at 32, also tapers inwardly toward edge 18; and the surface of such end edge conforms to the surface of a co-operating cone member, as disclosed in the above mentioned copending application. The angle of such end is predetermined, according to the desired extent of incremental radial feed. A slot 34 is formed adjacent such end edge 32. The bottom of the slot is spaced from the edge 20 and is substantially parallel therewith. A cooperating cone member, as disclosed in the above mentioned copending application, engages the outer side of slot 34 to shift the cutter radially in one direction. Another cooperating cone member, as disclosed in the copending application referred to, engages the side 32 to shift the cutter radially in the opposite direction.

When the cutter becomes dulled in use, the flats 28 and 30 may be ground back on the angles referred to and normal to the helix of the gear to be cut, and in this instance, the helix angle is zero for cutting spur gear teeth. The cutter thus retains its proper shape, conforming to the shape of the entire interdental space between the teeth of the gear to be cut.

Referring to Figures 6 through 10, the cutter is generally of the same form as the cutter described above, except that such cutter is designed for cutting helical gear teeth. The cutter portion 22 is thus formed so that the surfaces of such cutting portion are involute in form and the form has a cross-sectional configuration conforming to the shape of the entire interdental space between the teeth of the gear to be cut. The longitudinal linear elements which form the surfaces of the cutting portion also follow the helix of the gear to be cut, so that such portion is at a predetermined angle with respect to the axis of reciprocation of the gear element which is to be cut, and such predetermined angle is the helix angle. The leading cutting face of the cutting edge is formed with a flat which is at an angle of greater than 90° with the axis of the work when mounted in the machine and which is at an angle of substantially 90° to the helix in one plane when ground back along the cutting edge. The manner in which the element is mounted for reciprocation with respect to the gear teeth is clearly disclosed and claimed in the above-mentioned copending application. Also, when using the cutter disclosed in Figures 6 through 10, the work element, or gear blank, is rotated as it reciprocates so that it follows a path which is defined by the helix of the gear to be cut.

The term "involute" as here used is not limited to the theoretical curve but also includes the modified involutes which are referred to and understood in the art to be included in such term.

Formal changes may be made in the specific embodiment of the invention described without departing from the spirit and substance of the invention, the scope of which is commensurate with the appended claims.

What is claimed is:

1. A cutter for use in cutting teeth in machine elements comprising an elongated member generally rectangular in cross section, an elongated cutting portion formed along one end edge thereof, said cutting portion having cross sectional configuration conforming to the shape of the entire interdental space between the teeth to be cut, said one end edge tapering inwardly toward one of the side edges of said member to provide cutting clearance, the opposite end edge also tapering inwardly toward said one of the sides, and a slot in said member through said one of said sides substantially parallel to said opposite end edge.

2. A cutter for use in cutting teeth in machine elements comprising an elongated member generally rectangular in cross section, an elongated cutting portion formed along one end edge thereof, said elongated cutting portion being disposed at a pre-determined angle with respect to the sides of said member, said pre-determined angle being the helix angle of the teeth to be cut.

3. A cutter for use in cutting teeth in machine elements comprising an elongated member generally rectangular in transverse section, an elongated cutting portion formed along one end edge thereof, said elongated cutting portion being disposed at a pre-determined angle with respect to the sides of said member, said pre-determined angle being the helix angle of the teeth to be cut, one end of said elongated cutting portion being ground substantially flat at the cutting end thereof at an angle of substantially 90° to the helix.

4. A cutter for use in cutting the form of external involute teeth in machine elements comprising an elongated member having an elongated cutting portion along one end edge thereof, said cutting portion having the form of the cross-sectional configuration of an internal involute tooth conforming to the shape of the entire interdental space between the teeth to be cut.

5. A cutter for use in cutting teeth in machine elements comprising an elongated member having an elongated cutting portion along one end edge thereof, said cutting portion having a cross-sectional configuration conforming to the shape of the entire interdental space between the teeth to be cut, the leading end of said elongated cutting portion being ground with transverse flats thereon, the flat adjacent the tip of the cutting edge being at a smaller angle thereto than the flat remote therefrom.

JOHN SNEED